United States Patent
Fouillot et al.

(10) Patent No.: US 11,197,255 B2
(45) Date of Patent: Dec. 7, 2021

(54) RADIO SYNCHRONIZATION FOR FREQUENCY-HOPPING SYSTEMS

(71) Applicant: THALES, Courbevoie (FR)

(72) Inventors: Pascale Fouillot, Gennevilliers (FR); Roberta Fracchia, Gennevilliers (FR); Arnaud Descharles, Gennevilliers (FR); Stéphane Pega, Gennevilliers (FR)

(73) Assignee: THALES, Courbevoie (FR)

( * ) Notice: Subject to any disclaimer, the term of this patent is extended or adjusted under 35 U.S.C. 154(b) by 84 days.

(21) Appl. No.: 16/653,251

(22) Filed: Oct. 15, 2019

(65) Prior Publication Data
US 2020/0128501 A1   Apr. 23, 2020

(30) Foreign Application Priority Data

Oct. 18, 2018 (FR) ...................................... 1801099

(51) Int. Cl.
| | |
|---|---|
| *H04W 56/00* | (2009.01) |
| *H04B 1/713* | (2011.01) |
| *H04W 48/12* | (2009.01) |
| *H04W 72/04* | (2009.01) |
| *H04W 84/18* | (2009.01) |

(52) U.S. Cl.
CPC ........ *H04W 56/0015* (2013.01); *H04B 1/713* (2013.01); *H04W 48/12* (2013.01); *H04W 72/0446* (2013.01); *H04W 84/18* (2013.01)

(58) Field of Classification Search
CPC ......... H04W 56/0015; H04W 72/0446; H04W 84/18; H04B 1/713
See application file for complete search history.

(56) References Cited

U.S. PATENT DOCUMENTS

| | | | | |
|---|---|---|---|---|
| 2004/0028018 A1* | 2/2004 | Cain | ................... | H04B 7/2643 370/338 |
| 2005/0185628 A1* | 8/2005 | Watanabe | ........... | H04W 56/002 370/347 |
| 2010/0296493 A1 | 11/2010 | Lee et al. | | |
| 2013/0202013 A1* | 8/2013 | Van Stralen | .......... | H04W 72/02 375/133 |

(Continued)

FOREIGN PATENT DOCUMENTS

| | | |
|---|---|---|
| CN | 1719781 A | 1/2006 |
| WO | 2013/105085 A1 | 7/2013 |

*Primary Examiner* — Mohammad S Anwar
(74) *Attorney, Agent, or Firm* — BakerHostetler (57) ABSTRACT

A method for synchronizing in a TDMA frequency-hopping ad-hoc telecommunications network wherein slots includes at least one dwell of set duration and a guard time at least equal to the maximum propagation time in the network are respectively reserved for the emissions of one particular piece of equipment of the network, comprising: a first step of periodically allocating at least one slot per piece of equipment of the network for the transmission of a beacon, a second step wherein the beacon is emitted, a third step wherein each first piece of equipment of the network estimates a time difference $\Delta t$ from a start time of the slot and from an actual reception time of the beacon, and a fourth step wherein the first piece of equipment of the network uses the time difference $\Delta t$ for the reception of data slots sent by the second piece of equipment of the network.

11 Claims, 5 Drawing Sheets

(56) References Cited

U.S. PATENT DOCUMENTS

2015/0372717 A1* 12/2015 Schrum, Jr. ............. H04L 5/003
 370/458
2016/0020997 A1* 1/2016 Hui ..................... H04L 41/0654
 370/225

* cited by examiner

RADIO SYNCHRONIZATION FOR FREQUENCY-HOPPING SYSTEMS

CROSS-REFERENCE TO RELATED APPLICATIONS

This application claims priority to foreign French patent application No. FR 1801099, filed on Oct. 18, 2018, the disclosure of which is incorporated by reference in its entirety.

FIELD OF THE INVENTION

The invention relates to a synchronizing method for a frequency-hopping ad-hoc telecommunications network. More precisely, it aims to solve the problem of uncertainty in the carrier frequency to which the receiver must be programmed when the propagation duration of the transmitted data is longer than the duration between two frequency hops.

BACKGROUND

Frequency-hopping spread spectrum is a mechanism for transmitting data that is used in the military field and in the civilian field for the transmission of data. When it is used in the context of a time-division-multiple-access (TDMA) waveform, it consists in dividing the frequency band into a plurality of channels, then in transmitting the data using a combination of channels that varies over time according to a law known by all the participants of the network. The data are transmitted in short time periods, called "dwells", each dwell being transmitted in a frequency channel chosen depending on a preset hopping law. To do this, the data are grouped into data blocks, to which interleaving and an error-correcting code are applied. Each coded and interleaved data block is transmitted in one or more dwells. On reception, de-interleaving and decoding the data may make it possible to tolerate the loss of one or more of the data dwells.

Frequency hopping has a number of advantages:
  since the propagation channel varies from one frequency channel to another, frequency hopping makes it possible to benefit from frequency diversity. Thus, if the signal-to-noise ratio is very poor in one dwell because of the propagation conditions for example, it will not necessarily be in the other dwells, and the data block in its entirety will be able to be correctly decoded, which would not be the case if all of the data blocks were transmitted in the frequency channel having a poor signal-to-noise ratio. This property is an advantageous way of combating poor propagation conditions in one particular frequency channel (such as for example frequency-selective fading or flat fading), and jamming, whether intentional or unintentional (collisions), an observer outside the network seeking to intercept data transmitted in real time must know the hopping law. This hopping law is generally protected in order to guarantee the confidentiality of the data,
  when the number of frequency channels used is high, each of the channels is in the end only used little, this increasing the discretion of the data transmission.

The frequency-hopping mechanism therefore gives a waveform robustness to propagation conditions, to jamming and to interception, and makes it discrete, this making it particularly suitable for military transmissions. The markedness of these properties increases as the number of frequency channels used increases and as the hopping rhythm increases. In contrast, this mechanism requires a high number of frequency bands to be available, adding a substantial amount of complexity to the pieces of emitting/receiving equipment, and has a lower spectral efficiency than fixed-frequency transmissions.

In the context of a waveform with TDMA access, the various users of a telecommunications network share the time and frequency resources of the network. This sharing is organized around a TDMA frame, which assigns to each piece of equipment time intervals, most often referred to as slots or timeslots, during which a single piece of equipment may emit. In the rest of the document, these time intervals will be called slots.

The assignment of the slots to the various pieces of equipment of the network are managed in protocol layers of the pieces of equipment through mechanisms that are specific to this protocol layer and that will not be described in detail here because they are not the subject of the invention.

In the rest of the document, the term synchronization will mean the radio synchronization of the waveforms needing to be carried out in the MAC/physical layers, with the aim of compensating for delays related to the propagation of the signals within the telecommunications network, and not the synchronization of the clocks of the pieces of equipment, which is a function performed in the protocol layers and that is here considered to be a given and perfect. Those skilled in the art will easily be able to adapt the invention described below to a more real-life application in which the synchronization of the clocks is not perfect, by providing, in the waveform, margins dedicated to the compensation of clock drift.

In centralized telecommunications networks, such as for example mobile-telephone cellular networks, all the pieces of equipment of the network communicate with a single central node. The central node computes the propagation duration of the signal from each piece of equipment of the network, and transmits this time to the various pieces of equipment so that they may bring forward their emissions by a duration equal to this delay. This mechanism, which is known as timing advance, allows packet collisions to be avoided at the central node. It corresponds to the needs of a centralized communications network in which the pieces of equipment form point-to-point links with the central node.

Ad-hoc networks are telecommunications networks constructed from autonomous devices, which require no fixed infrastructure and may be highly mobile. The data are routed from one piece of equipment to another and from one subnetwork to another using the various nodes from which the network is formed. Such networks evolve dynamically depending on the appearance, disappearance and the availability of the nodes, and follow their changes in position. Thus, the path followed by a data packet between two nodes varies over time, and is very difficult to predict. Ad-hoc networks use point-to-point communications but also rely on point-to-multipoint communications. Evidently, the timing-advance mechanism is not applicable to point-to-multipoint communications in which the distances between users are all different. It is then necessary to provide in the slots guard times in order to prevent packet collisions.

For a TDMA ad-hoc network, each slot then comprises at least:
  a guard time during which no signal is transmitted. This guard time allows collisions between data packets sent consecutively by two pieces of equipment of the network to be avoided, it therefore has a duration at least equal to the maximum propagation time of the data in the telecommunications network, and one or more data dwells, the duration of which is given by the frequency-hopping rhythm. In these dwells are transmitted the useful data of the transmission, and various signals allowing various processing operations required to correctly receive the messages, such as the detection of the starts of dwells, the estimation of the propagation channel, etc., to be accomplished.

The duration of a slot is therefore at least equal to the propagation duration of a signal over a distance equal to the maximum range of the telecommunications network, plus the duration corresponding to the actual effective transmission of N dwells, where N≥1. Increasing the number of dwells of a slot allows the spectral efficiency of the waveform to improve by decreasing the re-occurrence of the guard times, but decreases the availability of the frequency resource. The choice of the number of dwells per slot is therefore a design choice that depends on the duration of the dwells, on the range of the network, on the number of pieces of equipment of the network, etc.

Solutions for performing the synchronization between emitters and receivers for such ad-hoc TDMA networks are known. This synchronization may be carried out dwell by dwell (dwell synchronization) or slot by slot (slot synchronization).

Figure 1A:
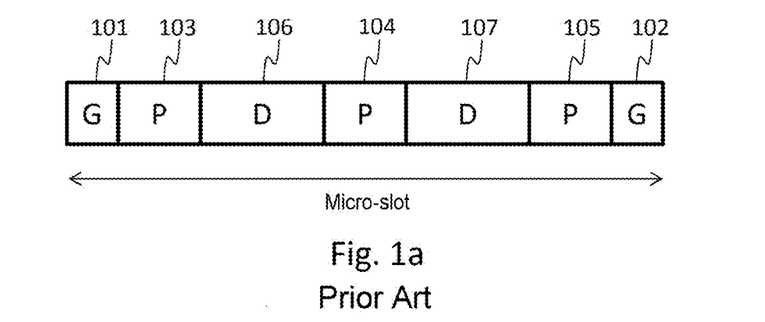
FIGS. 1a, 1b and 1c show, by way of illustration, the structure of a dwell in the context of a transmission according to the prior art in which the synchronization is carried out dwell by dwell, and the problems that such a synchronization causes.

FIG. 1a shows, by way of illustration, the structure of a data dwell in an ad-hoc telecommunications network, when the synchronization is carried out at the dwell level.

Each dwell comprises a first guard time 101, located at the start of the dwell, and a second guard time 102, located at the end of the dwell. These guard times give the hardware the time required to switch frequency channel. They also allow potential synchronization errors between the clocks of the pieces of equipment to be compensated for.

The dwells also comprise pilot sequences 103, 104 and 105, which are sequences of known symbols allowing the receiver to finely synchronize with the dwell, and to determine the start/end times of the signalling data and useful data transmitted. The pilot sequences also allow various signal-processing algorithms, such as the estimation of Doppler shifts, of frequency shifts, the estimation of the propagation channel, etc., to be executed. The number of pilot sequences per dwell and their position is a design choice, the most important thing being that each dwell comprises at least one pilot sequence, preferably positioned at the start of the dwell.

Lastly, the dwell comprises sequences 106, 107 used to transport useful data.

Figure 1B:
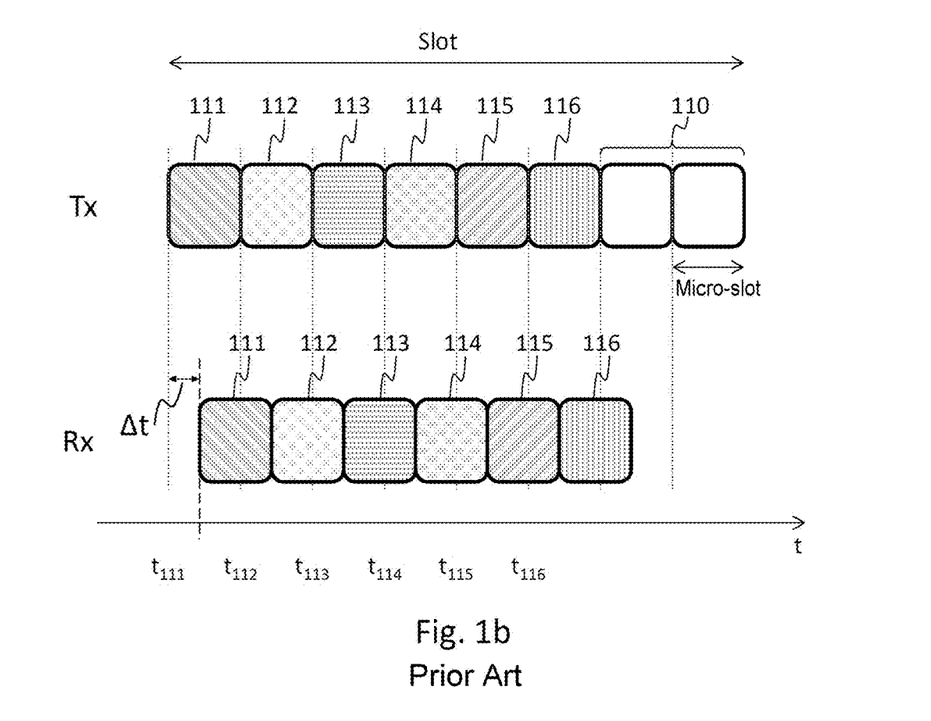

FIG. 1b shows the principle of a dwell synchronization according to the prior art carried out between an emitter Tx and a receiver Rx, in the case where the maximum delay in the network is shorter than the duration of a dwell.

In the case illustrated in FIG. 1b, and solely by way of illustration, the duration of one slot is eight dwells. The two last dwells correspond to a guard time 110 provided so as to prevent collisions of packets transmitted consecutively by separate pieces of equipment. No signal is transmitted during this guard time. Each slot therefore comprises, in this case, six dwells 111 to 116 of useful data, each of the dwells having a structure similar to that shown in FIG. 1a. For each dwell, the frequency channel used for the transmission is chosen from among all of the frequency channels depending on a hopping law known to the emitter and to all of the pieces of equipment intended to receive the data. The emission times of the dwells are known; they correspond, for dwells 111 to 116, to the emission times $t_{111}$ to $t_{116}$, respectively. These emission times are known to all of the pieces of equipment of the telecommunications network, because they are described by the TDMA frame.

In the case illustrated in FIG. 1b, the maximum propagation delay over the network is shorter than the duration of one dwell. The receiver Rx is configured to start searching for the first dwell 111 from the time $t_{111}$, which corresponds to the time at which the dwell 111 would actually be received in the absence of propagation delay. To do this, the receiver tunes its radio to the frequency channel corresponding to the first dwell 111, and searches for the signal corresponding to the first dwell (by way of the pilot sequence 103). The latter is detected at the time 117. The receiver then has available to it an estimation of a time difference Δt separating the actual dwell start time from the theoretical dwell start time $t_{111}$, and reconfigures itself so as to remain in the frequency channel corresponding to the dwell 111 during the duration of a dwell, starting from the actual dwell start time. In particular, at the time $t_{112}$, the receiver is in the process of receiving the first dwell, and knows that it must remain in the frequency channel of the first dwell. After receiving the first dwell, the receiver configures its radio to watch for the second dwell 112 in the appropriate frequency channel starting from the time $t_{112}$+Δt, and so on so as to receive all of the dwells 112 to 116.

When, at the time $t_{112}$, the receiver has not been able to detect the presence of the first dwell, because the propagation conditions are sufficiently poor to prevent its reception or because the dwell is jammed, the receiver is configured to tune itself to the frequency channel corresponding to the second dwell 112 and to search for this second dwell. Thus, the loss of the first dwell because of jamming for example does not lead to the loss of all of the slot.

This mechanism works perfectly provided that the duration corresponding to the maximum propagation time of a signal in the network plus the duration of the initial guard sequence plus the duration of the pilot sequence plus the detection time taken in the radio of the receiver to detect and take into account a piece of synchronization information is shorter than a duration of one dwell.

Figure 1C:
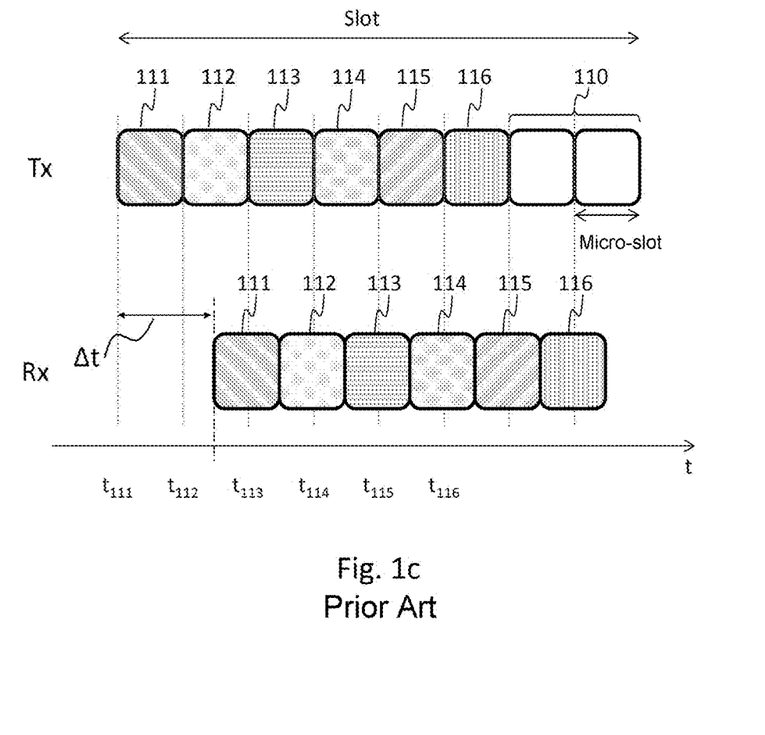

FIG. 1c shows the same dwell synchronization principle, employed between an emitter Tx and a receiver Rx according to the prior art, in the case where the maximum propagation delay in the network is longer than the duration of one dwell.

As in FIG. 1b, the receiver Rx is configured to search for the first dwell in the corresponding frequency channel starting from the time $t_{111}$. The time difference Δt corresponding to the propagation time of the signal is larger than the duration of one dwell, and hence, at the time $t_{112}$, the receiver has not detected the first dwell. It is then not able to determine whether it must:

change frequency channel in order to watch for the second dwell, the detection of the first dwell having failed because of poor propagation conditions or jamming for example, or remain in the frequency channel of the first dwell, the latter not having yet reached the receiver.

There is therefore an uncertainty as to the change of the frequency channels. The dwell synchronization mechanism is therefore unsuitable for the practical case where the propagation delay may be longer than the duration of one dwell.

Certain ad-hoc telecommunications networks, in particular networks of pieces of equipment in the aeronautical or naval field, have ranges that may reach several hundred kilometres (the propagation duration corresponding to the transmission of a signal over a distance of 500 km is 1.6 ms). In contrast, the robustness to interception and to jamming of a frequency-hopped waveform increases with the hopping rhythm. A hopping rhythm of several hundred or even several thousand hops per second is thus commonly reached, a rhythm of 1000 hops per second corresponding to a dwell of 1 ms. It is therefore necessary to find a solution allowing the propagation delay in an ad-hoc telecommunications network in which the propagation delay may be longer than the duration of one communication dwell to be estimated.

To this end, waveforms designed to achieve the synchronization between emitter and receiver at the slot level (slot synchronization) are known in the prior art. In a slot-synchronization mechanism, the dwell transmitted first is dedicated to sending a synchronization signal allowing the receiver to estimate a time difference $\Delta t$ related to the propagation delay between the emitter and receiver. The search therefor is carried out only once for all of the slot.

Figure 2:
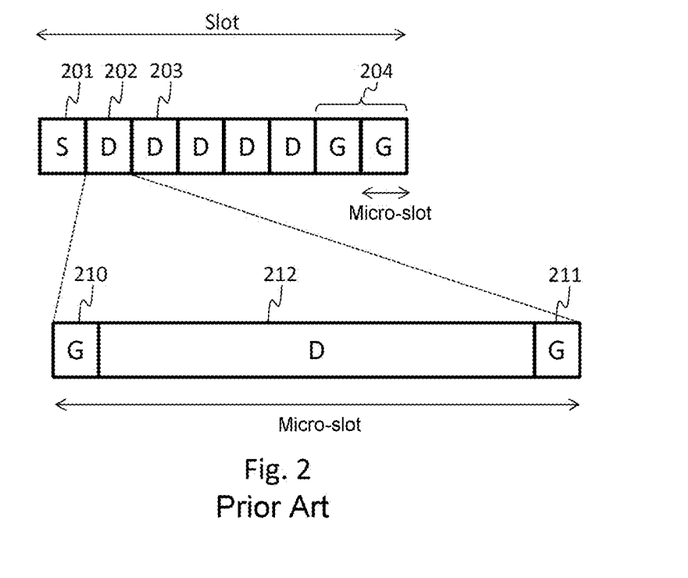
FIG. 2 shows, by way of illustration, the structure of a slot and of a dwell in the context of a transmission according to the prior art in which the synchronization is carried out slot by slot.

FIG. 2 shows, by way of illustration, the structure of a slot and of a dwell in the context of a transmission in which the synchronization is carried out at the slot level.

The slot comprises a first dwell 201 that transports a known sequence allowing the difference $\Delta t$ separating the actual reception time of the first dwell 201 from the start of the slot to be estimated. The following dwells 202, 203, transport the useful data. The slot ends with one or more guard dwells 204 that are not transmitted and that allow collisions between packets transmitted consecutively by separate pieces of equipment to be avoided, just like the dwells 110 of the example shown in FIG. 1b.

The data dwells (and identically the synchronization dwells) comprise a guard time 210 located at the start of the dwell, and a guard time 211 located at the end of the dwell in order to allow the piece of equipment to change frequency channel. The useful data (or the known sequences allowing the synchronization) are transmitted in the block 212.

The receiver tunes itself to the frequency channel with which the synchronization dwell 201 is transmitted, and does not change frequency channel provided that the synchronization dwell has not been received. It then calculates the difference $\Delta t$ corresponding to the propagation of the signal transmitted by the emitter, and switches the reception channels accordingly. This operating mode is independent of the length of the dwells and of the rhythm of the frequency hopping, this making it compatible with use in a context in which the propagation time may be longer than the duration of a dwell. However, with this mechanism, the correct reception of all of the slot depends on the synchronization dwell being correctly received. This solution is therefore not very robust to poor propagation conditions and/or jamming. Specifically, the loss of the first dwell leads to the loss of all of the slot.

Furthermore, with this solution, the time difference $\Delta t$ estimated in the first dwell is considered to be invariant over all of the slot. This assumption is often false, in particular in the aeronautical field in which the pieces of equipment move at very high speed. Errors in the sampling times of the dwells, and therefore incorrect receptions, result therefrom.

Although the slot-synchronization mechanism therefore well meets the need for synchronization in a frequency-hopping network when the propagation duration may be substantially equal to or longer than the duration of a dwell, it is not optimal because it does not allow variations in propagation time in the network to be followed, and is not very robust to jamming and poor propagation conditions.

There is therefore a need relating to a solution allowing receivers to remove any uncertainty in the planning of the reception frequency channels while overcoming all of the aforementioned problems of the prior art.

SUMMARY OF THE INVENTION

To this end, the invention describes a method for synchronizing in a frequency-hopping ad-hoc telecommunications network. The network comprises a plurality of pieces of equipment configured to exchange data organized in TDMA fashion, i.e. into a time frame. In this frame, time intervals called slots, comprising at least one dwell of set duration transmitted in a frequency channel selected from among a plurality of frequency channels and a guard time of a duration at least equal to the propagation time of a signal over a distance corresponding to a maximum range of the telecommunications network, are reserved for the emissions of one particular piece of equipment among the pieces of equipment of the network. The synchronizing method is characterized in that it comprises:

a first step of periodically allocating at least one slot of the time frame per piece of equipment of the network for the transmission of a beacon, a second step in which said beacon is emitted by the pieces of equipment of the network in the slots that are allocated thereto in the first step, a third step, carried out by each first piece of equipment of the network entering into radio contact with a second piece of equipment of the network, of receiving a beacon emitted by the second piece of equipment and of estimating a time difference $\Delta t$ from a start time of the slot and from an actual reception time of said beacon, and a fourth step in which the first piece of equipment of the network uses said time difference $\Delta t$ to program frequency channels for receiving data slots sent by said second piece of equipment of the network.

Advantageously, the method furthermore comprises a fifth step of updating the time difference $\Delta t$ on the basis of the emissions made by said second piece of equipment of the network.

In one embodiment, the slots allocated for the transmission of the beacon comprise a single dwell.

In one embodiment, the transmitted dwells comprise an initial guard time, a final guard time, and at least one data sequence known to all of the pieces of equipment of the network and used for the detection of the dwells.

The fourth step of using the time difference $\Delta t$ to program the frequency channels for receiving data slots sent by the second piece of equipment comprises receiving the dwells of the data slot in each of the frequency channels associated with said dwells successively during durations equal to the duration of one dwell starting from a time determined by a start time of the slot and the time difference $\Delta t$.

According to one embodiment of the method, the fifth step of updating the time difference $\Delta t$ is carried out on each reception of a beacon emitted by the second piece of equipment.

According to another embodiment, compatible with the preceding one the fifth step of updating the time difference $\Delta t$ is carried out on each reception of a signal emitted by the second piece of equipment in a data slot. The update of the time difference $\Delta t$ then comprises estimating a time difference between a dwell start time and an actual reception time of the dwell for the dwells of said data slot. This time difference $\Delta t$ is updated on the basis of the smallest time difference estimated in the dwells of the data slot. Alternatively, it is updated on the basis of the average of the time differences estimated in the dwells of the data slot.

According to one embodiment of the method the slot allocations for the transmission of beacons are performed statically, and the slot allocations for the transmission of signals other than beacons are performed dynamically.

The invention also relates to a method for receiving data, said method being implemented by a first piece of equipment in a frequency-hopping ad-hoc telecommunications network. The network comprises a plurality of pieces of equipment configured to exchange data organized into a time frame comprising time intervals called slots, each slot comprising at least one dwell of set duration transmitted in a frequency channel selected from among a plurality of frequency channels and a guard time of a duration at least equal to the propagation time of a signal over a distance corresponding to a maximum range of the telecommunications network, each slot being reserved for the emissions of a particular piece of equipment among the pieces of equipment of the network. The method is characterized in that it comprises:

a step of searching for a beacon emitted in a dedicated slot of the time frame for each second piece of equipment with which the first piece of equipment was not previously in radio contact, and when the beacon is detected:

a step of estimating a time difference $\Delta t$ relevant to said second piece of equipment from a start time of the slot and from an actual reception time of the beacon, and a step of using the time difference $\Delta t$ to program frequency channels for receiving data slots sent by said second piece of equipment of the network.

Advantageously, the method for receiving data furthermore comprises a step of updating the time difference $\Delta t$ on the basis of the emissions made by said second piece of equipment of the network.

Lastly, the subject matter of the invention relates to a piece of equipment for emitting/receiving in a frequency-hopping ad-hoc telecommunications network, characterized in that it is configured to implement the method for receiving data according to one of the embodiments described above.

BRIEF DESCRIPTION OF THE DRAWINGS

The invention will be better understood and other features and advantages will become more clearly apparent on reading the following description, which is nonlimiting, and by virtue of the appended figures, in which.

DETAILED DESCRIPTION

In the rest of the document, the time taken by a radiofrequency signal to travel a distance corresponding to the theoretical maximum range of the telecommunications network will be referred to as "maximum propagation duration". Specifically, this maximum range is a piece of information that is known when a telecommunications network is commissioned: it is generally a specification and allows many parameters, such as emission powers for example, and therefore the size of the amplifiers and of the batteries used, to be dimensioned.

The aim targeted by the invention is to provide a mechanism allowing the time difference $\Delta t$ separating the start of the slot from the actual time at which the signal is received in an ad-hoc frequency-hopping network to be estimated and compensated for, and that is compatible with dwell durations shorter than the maximum propagation time in the network. The proposed method allows uncertainties in the pieces of receiving equipment as to the times at which they must change frequency channel to be removed. Another aim targeted by the invention is that this method be robust to jamming and to variations in propagation conditions, this excluding any synchronization mechanism carried out at the slot level such as described with reference to FIG. 2.

To do this, the method that is one subject of the invention proposes to reserve particular slots of the TDMA frames in to which the transmissions are organized, so that each piece of equipment of the network transmits in turn a so-called beacon signal able to consist of any data, the piece of equipment from which the emission originated and the emission time being known to all the pieces of equipment of the network. This beacon allows each piece of equipment of the network able to receive it to estimate a time difference $\Delta t$ separating it from the piece of equipment that emitted the beacon. The organization of the TDMA frame as regards the emission of the beacons, i.e. the slots allocated to this end and the pieces of equipment to which they are attributed, are known by all of the pieces of equipment of the network. The TDMA frame is organized so that each piece of equipment transmits the beacon in turn, so that pieces of equipment of the network that enter into radio contact are able to estimate the time difference $\Delta t$, which datum is required for the transmission of useful data between these pieces of equipment. The beacon is transmitted over a given frequency channel. It may be emitted in slots that are shorter than the data slots. It is therefore advantageously transmitted in a single dwell.

The pieces of equipment of the network are configured to watch for all of the beacons transmitted by the pieces of equipment of the network in the slots that are attributed to this end. When a beacon is detected for the first time, such as for example when two pieces of equipment that were beforehand too far away to communicate get closer together or when a piece of equipment is turned on, the time difference $\Delta t$ is estimated by virtue of the beacon. In order to remove any uncertainty in the frequency channel to be watched, the beacon is transmitted in a single dwell. It furthermore comprises a guard time allowing collisions between consecutive slots to be avoided. The receiver watching for the beacon is configured to remain in the associated frequency channel for a maximum duration relating to the maximum propagation time in the network, and not to the duration of the dwell. When the beacon is detected, a time difference $\Delta t$ corresponding to the propagation delay of the signal between the two pieces of equipment is estimated, then used for the reception of the following data slots transmitted by the same emitter. The time difference $\Delta t$ is updated sufficiently often to follow the variations related to the relative movements of the pieces of equipment of the network.

The dwells used for the transmissions of beacons or of useful data comprise a sequence known to the emitter and receivers, such as the pilot sequence 103 of FIG. 1a. The receivers are configured to detect the dwells by computing a correlation product between the known data sequence and the received signal. The peaks of the correlation product correspond to the reception time of the known sequence in the dwell, and therefore allow the actual time at which each dwell is received to be determined. Advantageously, the dwells also comprise initial and final guard times comparable to the guard times 101 and 102 of FIG. 1a, which allow potential offsets between the clocks of the pieces of equipment, potential measurement errors, and variations in the propagation times between pieces of equipment to be compensated for.

The synchronizing method that is one subject of the present invention is thus implemented partially in the protocol layer (allocation of particular slots for the transmission of beacons, programming of the receiver to search for the beacon, estimation of a propagation delay between each of the pieces of equipment of the network, use of this delay to program the radio portion of the receiver) and partially in the physical layer (measuring and taking into account propagation delays estimated during the reception of the dwells used to transmit beacons and to transmit useful data).

Figure 3:
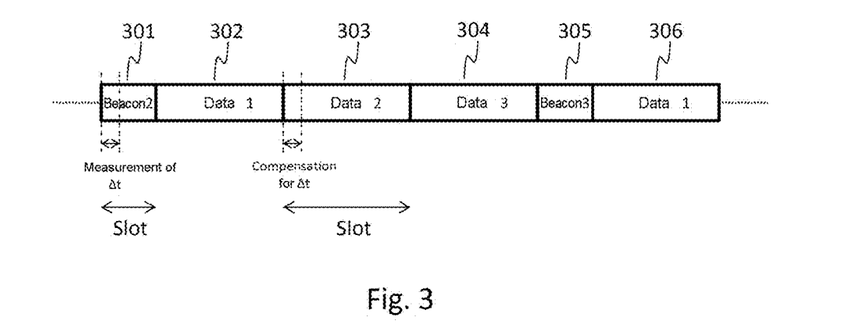
FIG. 3 shows an example of a TDMA frame allowing the synchronizing method according to one embodiment of the invention to be implemented.

FIG. 3 shows an example of a TDMA frame allowing the synchronizing method according to one embodiment of the invention to be implemented. Shown therein is a TDMA frame segment comprising six slots 301 to 306 in a network comprising three pieces of equipment.

The TDMA frame comprises slots 302, 303, 304 and 306 that serve for the transmission of useful data. Slot 302 is assigned to the transmission of data by piece of equipment number 1, slot 301 to the transmission of data by piece of equipment number 2, slot 303 to the transmission of data by piece of equipment number 3 and slot 306 to the transmission of data by piece of equipment number 1. Each of these slots comprises one or more dwells transmitted in frequency channels chosen from among a plurality of frequencies channels using a predefined hopping law known to all of the pieces of equipment of the telecommunications network. The allocation of these slots to the various pieces of equipment may be static, each piece of equipment speaking in turn, or dynamic, the assignments being carried out depending on the needs in terms of passband of each of the pieces of equipment and on the priority of their messages. Slots 301 and 305 are dedicated to the transmission of a beacon, by pieces of equipment number 2 and number 3, respectively. The duration between two slots dedicated to the transmission of the beacon from a given piece of equipment of the network is advantageously chosen depending on a duration for which the time difference $\Delta t$ is considered to be valid, this duration being related to the maximum speed of movement of the pieces of equipment and to the length of the guard intervals of the dwells allowing compensation for variation in the time difference $\Delta t$. This duration is therefore a design parameter related to the expected behaviour of the pieces of equipment of the telecommunications network. The possibility that one or more successive beacons will not be detected by a piece of equipment of the network may furthermore be taken into account, by increasing the frequency of the allocations of slots for the transmission of beacons.

In the example of FIG. 3, piece of equipment number 2 of the telecommunications network transmits a beacon in slot 303. The beacon does not necessarily contain data other than known sequences allowing the receiver to detect the dwell, but it may also contain data of any other type, such as for example data used for the synchronization of the clocks or of the protocol layers of the various pieces of equipment of the network. During the slot 301, pieces of equipment that do not have available to them an estimate of the time difference $\Delta t$ relevant to the node 2 watch for the beacon. The other pieces of equipment may also watch for this beacon, so as to adjust their estimate of the time difference $\Delta t$ relevant to the piece of equipment that emitted the beacon. During the reception of the beacon, each piece of equipment is configured to record the arrival time of the signal corresponding to the known sequence, and to use it to estimate the time corresponding to the start of the received dwell. The difference $\Delta t$ corresponds to the difference between the start time of the slot 301 and the actual time at which the dwell used for the transmission of the beacon was received.

Subsequently, during the transmission of a data slot, such as for example during the transmission of the slot 303 of FIG. 3, the pieces of receiving equipment know the time difference $\Delta t$ that the reception of the transmissions made by the piece of equipment 2 is subject to, and are configured to take into account this time difference when programming their radio chain: the frequency hops are programmed to have durations equal to the duration of a dwell starting from a time corresponding to the start time of the slot delayed by $\Delta t$.

The transmission of a beacon in a dedicated slot by each piece of equipment of the network makes it possible to guarantee that each piece of equipment emits with a sufficient frequency, which would not have been the case in the case of a completely dynamic TDMA setup. The presence of a beacon specifically dedicated to the computation of the time difference $\Delta t$, which beacon is emitted by each of the pieces of equipment of the network successively, makes it possible to guarantee that all of the pieces of equipment in radio contact are able to compute this time difference and to keep it up-to-date, and therefore to communicate with all the pieces of equipment within radio range.

The transmission times of the beacon of each piece of equipment, i.e. the positions in the TDMA frame of the dedicated slots, are set and known to all of the pieces of equipment of the telecommunications network, contrary to the data slots which may be allocated dynamically. The slots for the transmission of the beacon are allocated statically and periodically to each piece of equipment in order to meet the requirements with respect to the validity of the estimated time differences $\Delta t$, this allowing each piece of equipment to know the times and the pieces of equipment to which these slots are allocated.

Figure 4:
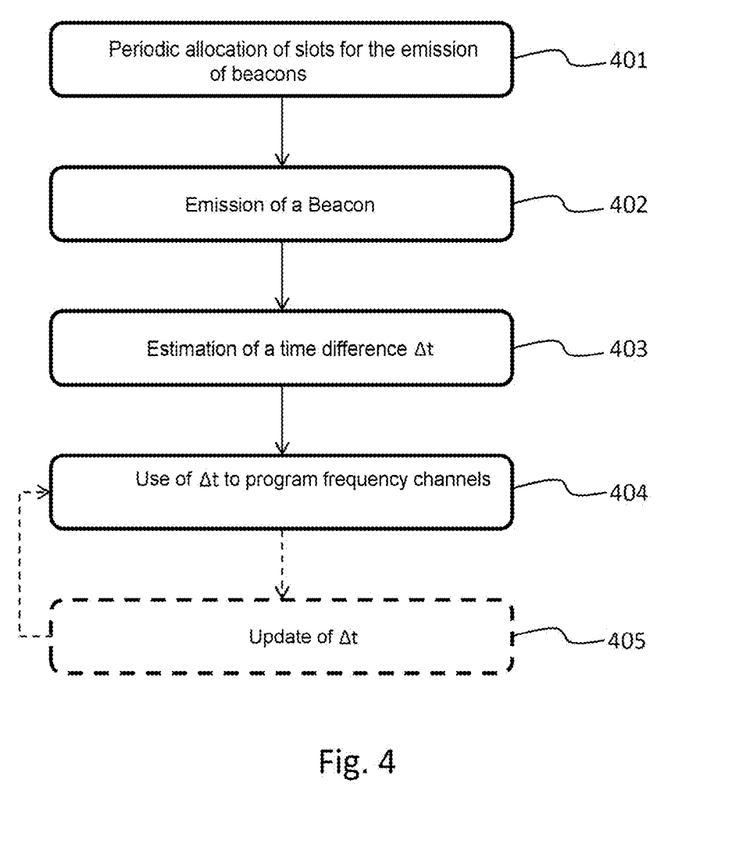
FIG. 4 shows the steps implemented by a synchronizing method according to one embodiment of the invention.

FIG. 4 shows the various steps implemented in a synchronizing method according to one embodiment of the invention. The method is intended to be implemented in a frequency-hopping ad-hoc network comprising a plurality of pieces of emitting/receiving equipment, in which network the data are transmitted in TDMA fashion, i.e. they are organized into a time frame such as that shown in FIG. 3, in which frame slots are attributed to the various pieces of equipment of the network. The duration of a slot may vary, but it is necessarily longer than the maximum propagation time of a signal in the telecommunications network.

The described method comprises a first step 401 of allocating, in the TDMA frame, slots dedicated to the transmission of beacons. This allocation is carried out for each of the pieces of equipment of the network intended to emit data. These allocations are carried out at times known to all of the nodes of the network. These nodes also know the piece of equipment that was the origin of the emission of the beacon signal in each of the intervals. Such a static allocation of slots for the transmission of beacon signals is not incompatible with the dynamic allocation of slots for the transmission of data in the rest of the TDMA frame, i.e. with allocations carried out depending on the inputs/outputs of the pieces of equipment of the network, and/or depending on the needs of each of the pieces of equipment of the network and on the priority of the messages. The slots for the transmission of the beacons have a duration equal to one dwell plus a guard time at least equal to the maximum propagation time within the telecommunications network.

The described method then comprises a second step 402 in which the pieces of equipment emit the beacon in the slots that were allocated thereto to this end. The dwell in which the beacon is emitted comprises at least one guard time positioned at the start of the dwell and one guard time positioned at the end of the dwell, comparably to the guard times 101 and 102 described in FIG. 1*a*. These guard times serve to compensate for potential clock offsets between the various pieces of equipment, but also to compensate for potential variations in the time difference $\Delta t$ between two measurements, these variations being related to the relative movements of the pieces of equipment. The beacon furthermore comprises a sequence known to all the pieces of equipment of the network, which allows the latter to detect the start of the dwell. This known sequence consists of a succession of known symbols, just like the pilot sequence 103 described with reference to FIG. 1*a*. It is advantageously positioned at the start of the dwell, just after the guard time, but could be positioned at any location in the dwell. It may be a question of a set reference sequence, of a reference sequence chosen from a high number of reference sequences according to a law known to the pieces of equipment of the network, or of a random sequence generated with a seed known to the pieces of equipment of the network. Advantageously, the dwell containing the known sequence may be also contain any other data that if lost would not impact the operation of the telecommunications network, such as for example signalling data allowing the protocol layers, and in particular the clocks, of the pieces of equipment of the network to be synchronized.

The method then comprises a step 403 of estimating a time difference $\Delta t$. This step is carried out by all of the pieces of equipment that do not have available to them an estimate of the time difference $\Delta t$ relevant to the piece of equipment emitting the beacon, i.e. all of the pieces of equipment entering into radio contact with the piece of equipment emitting the beacon. This is for example the case when two pieces of equipment that were beforehand too far apart to communicate get closer together, when the emission power of a piece of equipment increases, when the jamming or propagation conditions change, or when a piece of equipment enters into the network. This step may be carried out by all the pieces of equipment of the network, in order to update each estimate of the time difference $\Delta t$.

To this end, the pieces of equipment carrying out step 403 tune their radio to the frequency channel used for the transmission of the beacon and watch for the beacon starting from the start of the slot, and until its detection or otherwise until a duration at least equal to the maximum propagation time in the network has passed. The pieces of receiving equipment detect the presence of the beacon by virtue of the sequence of known symbols that it contains. They determine an arrival time of said sequence, and therefore an arrival time of the dwell used to transmit the beacon. The difference between this actual arrival time of the dwell and the slot start time allows each receiver to estimate the time difference $\Delta t$ separating it from the emitter of the beacon. Since the beacon comprises only a single dwell, it may be searched for by the receivers in all of the slot without a decision having to be taken with respect to a change of reception frequency channel, this making the method that is one subject of the invention compatible with implementation in a network in which the maximum propagation duration is longer than the duration of one dwell. Step 403 of determining the time difference $\Delta t$ is a preliminary step that is indispensable to the correct reception of the useful data transmitted between two pieces of equipment of the network.

The method lastly comprises a step 404 of using the estimated time difference $\Delta t$ to program the reception of the following emissions made by the pieces of equipment of the network. To this end, the pieces of equipment receiving the useful data are configured to program their radio chain in order to watch for the first data dwell, in the associated frequency channel, starting from a time corresponding to the start time of the slot plus $\Delta t$. They are also programmed to change frequency channel at set intervals corresponding to the duration of a dwell so as to receive the successive dwells, and to do so without taking into account the reception state of the dwell. In each dwell, the receiver is configured to watch for the sequence of known data, by correlation, in order to detect the actual start of the dwell. When the time difference $\Delta t$ has remained constant since its estimation, which is carried out in the third step, the actual reception of each dwell will correspond exactly to the programmed time of the receiver. Each dwell will then be received in its entirety before the next change of frequency channel. When the difference has varied since its estimation, the actual time of reception of each dwell will be advanced or delayed with respect to the time programmed in the receiver, but, by virtue of the search for the sequence of known data, the receiver follows the variations in $\Delta t$. Furthermore, the guard intervals positioned at the start and end of each dwell guarantee that all of the useful data of the dwell are received in the time interval in which the frequency channel is considered. Thus, the receiver finely synchronizes itself to each received dwell by searching for the transported known sequence, comparatively to what is done in the context of a dwell synchronization, with the notable difference that this fine synchronization no longer sets the times at which the changes of frequency channel occur. Said times are determined on the basis of the value $\Delta t$, which value is estimated via the beacons then advantageously updated as time goes by.

To this end, the method according to the invention comprises an additional step 405 of updating the time difference $\Delta t$ on the basis of the received signals. This step is carried out at discrete times and periodically.

In one embodiment of the invention, this update is carried out on each reception of a beacon. The receiver then estimates the time difference $\Delta t$ via the beacon in a way that is completely identical to that used in step 403 of the method. This embodiment allows the difference $\Delta t$ of all the nodes of the network to be updated, even when said nodes are not transmitting useful data. When the beacon has not been correctly received, for example in case of poor propagation conditions, jamming or temporary masking, the difference $\Delta t$ is not updated, and the last validly estimated difference is used.

In another embodiment, the estimation of the difference $\Delta t$ is updated on each reception of slots transmitting useful data (in contrast to slots transmitting beacons). Specifically, in step 404, a fine synchronization intended to detect a variation in the difference $\Delta t$ is carried out for each dwell of the slots used for the transmission of useful data. A measurement of the time difference $\Delta ti$ may be carried out in each of the dwells, $\Delta ti$ being the difference between the start time of dwell i (i.e. the slot start time for the first dwell, the slot start time plus the duration of one dwell for the second dwell, etc.) and the actual reception time of dwell i. These differences $\Delta ti$ may be used to replace the time difference $\Delta t$, the mean of the $\Delta ti$ for example being considered, thus improving the robustness to measurement noise, or the smallest measured $\Delta ti$ being considered, thus improving the robustness to multiple reflections of the signal, the optimal synchronization position in the presence of multipath interference corresponding to the position of the path received first when the receiver comprises an equalizer. When a dwell is not correctly received, for example because of multi-path interference, jamming or temporary masking, the associated value of $\Delta ti$ is not considered for the update of $\Delta t$. This embodiment allows the estimated difference $\Delta t$ to be very regularly updated.

The two preceding embodiments may be implemented separately or simultaneously.

Once the value of the time difference $\Delta t$ has been updated, this value is used to program the frequency channels of the receiver during reception of the data slots (step 404).

With respect to the prior art, the proposed synchronizing method makes it possible to remove any ambiguity relative to the change of frequency channel in cases where the propagation duration may be close to or longer than the duration of one dwell, contrary to the prior-art solution shown in FIGS. 1a to 1c. The proposed solution is compatible with an implementation in ad-hoc networks and in particular works with point-to-multipoint communication. It creates no particular weakness to detection and jamming because the synchronization signal has no particular marker that could allow an observer outside the network to detect it. Lastly, contrary to the prior art illustrated in FIG. 2, the proposed solution has the advantage of compensating for and following variations in the propagation times between pieces of equipment, which may occur between two estimations of the propagation delay.

Figure 5:
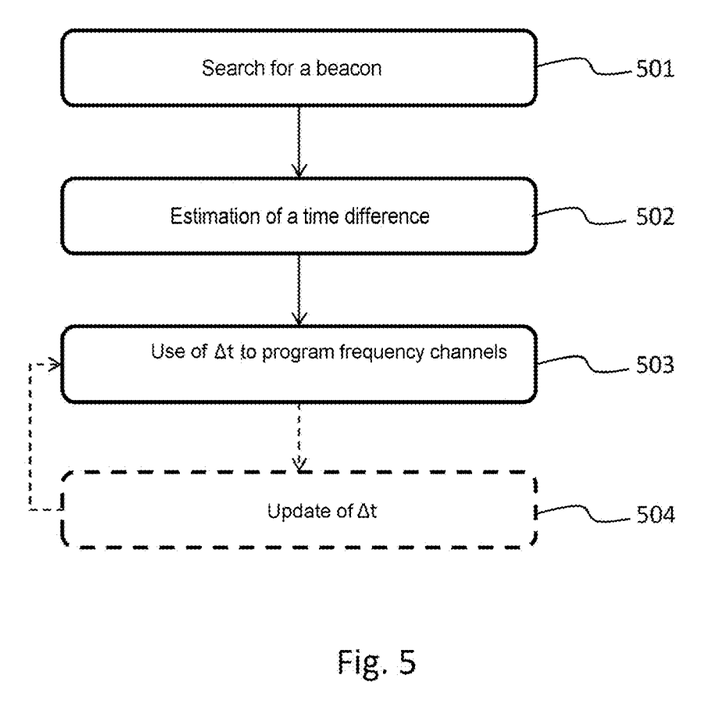
FIG. 5 shows the steps implemented by a method for receiving data according to one embodiment of the invention.

The invention also relates to a method for receiving data, which method is implemented by a first piece of equipment in a frequency-hopping ad-hoc telecommunications network. FIG. 5 illustrates the steps of one embodiment of the method. The data are organized in TDMA fashion in the network, i.e. slots are successively reserved for the emissions of one particular piece of equipment among all of the pieces of equipment of the network. Each slot has a duration equal to the duration of one dwell (inverse of the hopping rhythm) multiplied by the number of dwells of the slots plus a guard time, the duration of which is at least equal to the maximum propagation time in the network.

The method implemented in the piece of receiving equipment comprises a first step 501 of searching for a beacon emitted by a second piece of equipment in the slot specially reserved to this end. This step is carried out at least when the first piece of equipment does not have available to it an estimate of the time difference $\Delta t$ relevant to the second piece of equipment. The receiver is configured to search for the beacon in a given frequency channel, until its detection or otherwise for a duration at least equal to the maximum propagation time in the telecommunications network.

When the beacon is not detected, the receiver must wait for the transmission, by the same second piece of equipment, of a subsequent beacon to restart step 501.

When the beacon is detected, the method comprises a step 502 of estimating a time difference $\Delta t$ between the first and second piece of equipment. This time difference is estimated from the start time of the slot dedicated to the transmission of the beacon, and from the time at which the beacon was actually received.

Lastly, the method comprises a third step 503 of programming frequency channels of the radio chain of the first piece of equipment for the reception of the data slots transmitted by the second piece of equipment. The radio chain is programmed to tune itself to the frequency channels corresponding to the transmitted data slot during durations equal to the duration of one dwell starting from a time corresponding to the start of the data slot delayed by a duration equal to the estimated time difference $\Delta t$.

Advantageously, the method comprises a step 504 of updating the time difference $\Delta t$ relevant to the second piece of equipment. This update may be carried out on the basis of the beacons transmitted by the second piece of equipment, on the basis of the useful data transmitted by the second piece of equipment, or on the basis of both thereof.

Lastly, the invention relates to a piece of receiving equipment in a frequency-hopping ad-hoc telecommunications network, configured to implement a receiving method such as that described above. A number of levels of the receiver are configured:
 the protocol layer is configured to take into account slots dedicated to the transmission of data, which slots are used to synchronize the receiver with a given emitter, and to measure the propagation delay to this emitter,
 the physical layer is configured to take into account propagation-delay measurements during the programming of the frequency hops.

To this end, the piece of equipment in question has available to it a controllable radio chain, allowing a frequency channel to be selected for the reception of data, and a digital processing chain, in which the method described above is implemented, said chain for example being a digital signal processor (DSP), a field-programmable gate array (FPGA) or an application-specific integrated circuit (ASIC), or any hardware target, such as a processor, allowing the required processing operations to be executed.

The invention claimed is:

1. A method for synchronizing in a frequency-hopping ad-hoc telecommunications network comprising a plurality of pieces of equipment configured to exchange data organized into a time frame comprising time intervals called slots, each slot comprising at least one dwell of set duration transmitted in a frequency channel selected from among a plurality of frequency channels and a guard time of a duration at least equal to a propagation time of a signal over a distance corresponding to a maximum range of the telecommunications network, each slot being reserved for emissions of one particular piece of equipment among the pieces of equipment of the network, the method being wherein it comprises:
 a first step of periodically allocating at least one slot of the time frame per piece of equipment of the network for the transmission of a beacon,
 a second step wherein said beacon is emitted by the pieces of equipment of the network in the slots that are allocated thereto in the first step,
 a third step, carried out by each first piece of equipment of the network entering into radio contact with a second piece of equipment of the network, of receiving a beacon emitted by the second piece of equipment and of estimating a time difference $\Delta t$ from a start time of the slot and from an actual reception time of said beacon, and a fourth step wherein the first piece of equipment of the network uses said time difference Δt to program the reception of data slots sent by said second piece of equipment of the network, by receiving the dwells of the data slot in each of the frequency channels associated with said dwells successively during durations equal to the duration of one dwell starting from a time determined by a start time of the slot and the time difference Δt.

2. The synchronizing method according to claim 1, furthermore comprising a fifth step of updating the time difference Δt on the basis of emissions made by said second piece of equipment of the network.

3. The synchronizing method according to claim 2, wherein the fifth step of updating the time difference Δt is carried out on each reception of a beacon emitted by the second piece of equipment.

4. The synchronizing method according to claim 2, wherein the fifth step of updating the time difference Δt is carried out on each reception of a signal emitted by the second piece of equipment in a data slot, the update of the time difference Δt comprising estimating a time difference between a dwell start time and an actual reception time of the dwell for the dwells of said data slot, the time difference Δt being updated on the basis of the smallest time difference estimated in the dwells of the data slot.

5. The synchronizing method according to claim 2, wherein the fifth step of updating the time difference Δt is carried out on each reception of a signal emitted by the second piece of equipment in a data slot, the update of the time difference Δt comprising estimating a time difference between a dwell start time and an actual reception time for the dwells of said data slot, the time difference Δt being updated on the basis of the average of the time differences estimated in the dwells of the data slot.

6. The synchronizing method according to claim 1, wherein the slots allocated for the transmission of the beacon comprise a single dwell.

7. The synchronizing method according to claim 1, wherein the transmitted dwells comprise an initial guard time, a final guard time, and at least one data sequence known to all of the pieces of equipment of the network and used for the detection of the dwells.

8. The synchronizing method according to claim 1, wherein the slot allocations for the transmission of beacons are performed statically, and the slot allocations for the transmission of signals other than beacons are performed dynamically.

9. A method for receiving data, said method being implemented by a first piece of equipment in a frequency-hopping ad-hoc telecommunications network comprising a plurality of pieces of equipment configured to exchange data organized into a time frame comprising time intervals called slots, each slot comprising at least one dwell of set duration transmitted in a frequency channel selected from among a plurality of frequency channels and a guard time of a duration at least equal to a propagation time of a signal over a distance corresponding to a maximum range of the telecommunications network, each slot being reserved for emissions of a particular piece of equipment among the pieces of equipment of the network, the method being wherein it comprises:
a step of searching for a beacon emitted in a dedicated slot of the time frame for each second piece of equipment with which the first piece of equipment was not previously in radio contact, and when the beacon is received:
a step of estimating a time difference Δt relevant to said second piece of equipment from a start time of the slot and from an actual reception time of the beacon, and a step of using the time difference Δt to program the reception of data slots sent by said second piece of equipment of the network by receiving the dwells of the data slot in each of the frequency channels associated with said dwells successively during durations equal to the duration of one dwell starting from a time determined by a start time of the slot and the time difference Δt.

10. The method for receiving data according to claim 9, furthermore comprising a step of updating the time difference Δt on the basis of emissions made by said second piece of equipment of the network.

11. A piece of equipment in a frequency-hopping ad-hoc telecommunications network, wherein it is configured to implement a method for receiving data according to claim 9.

* * * * *